Patented Jan. 1, 1952

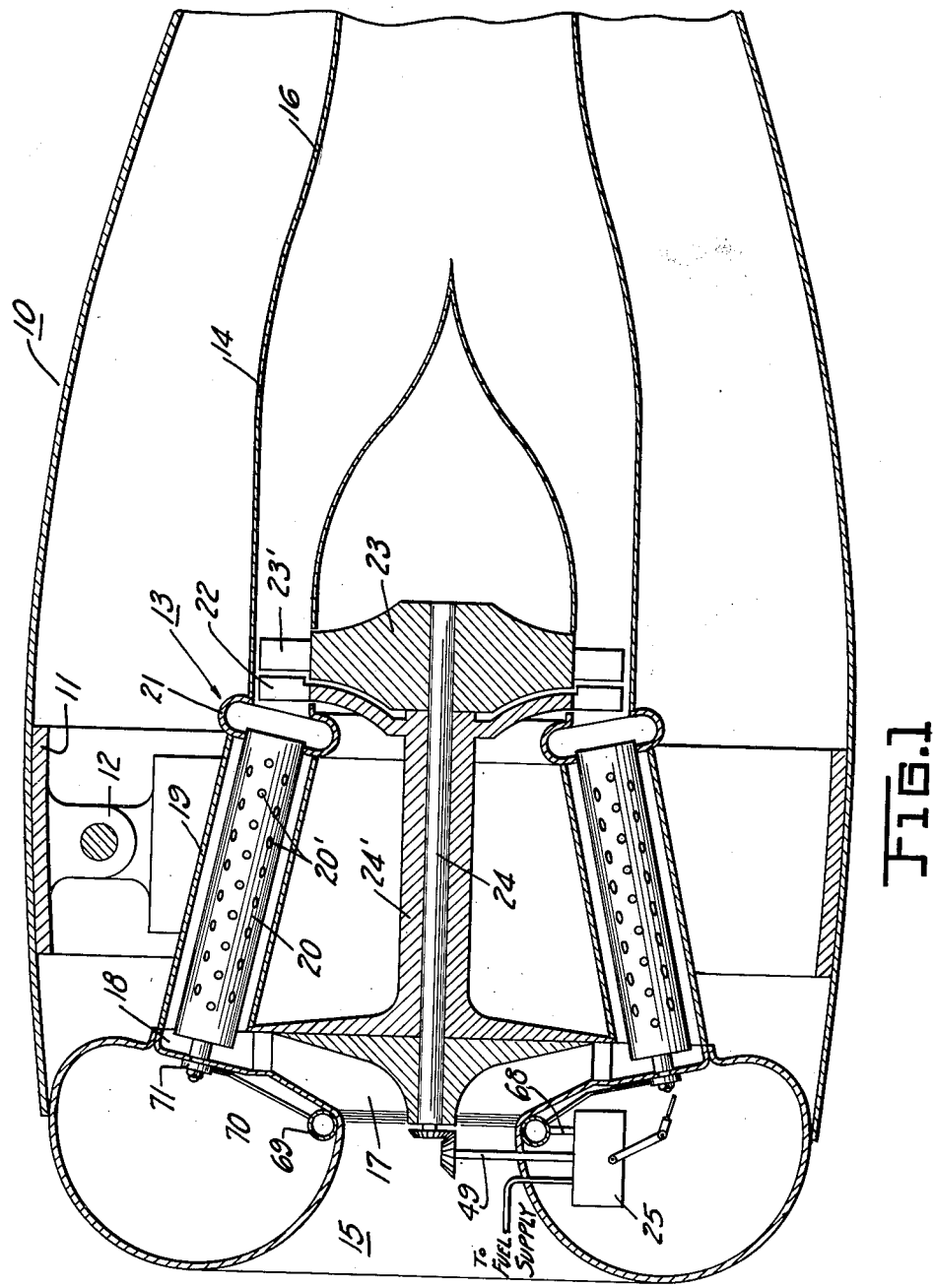

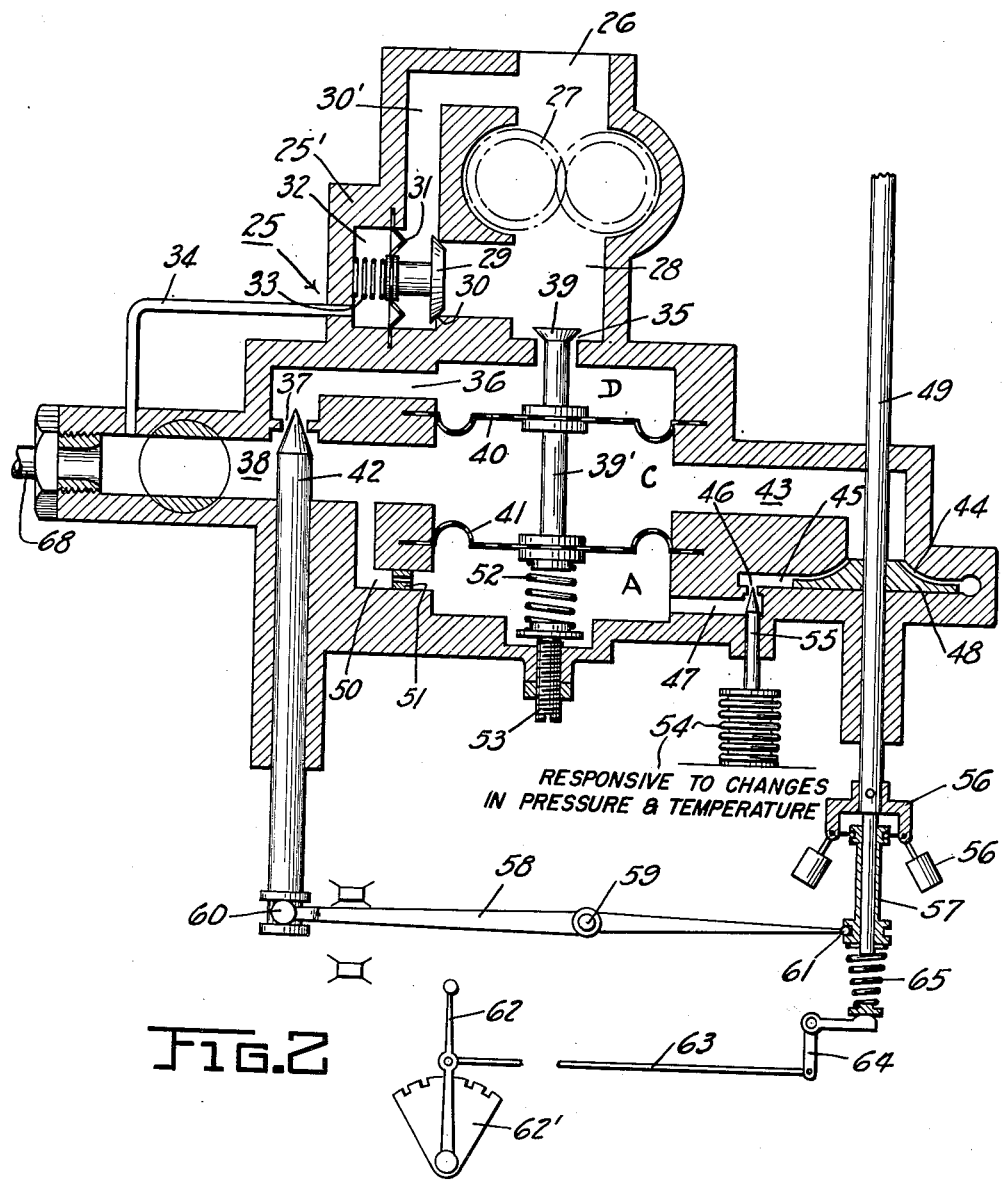

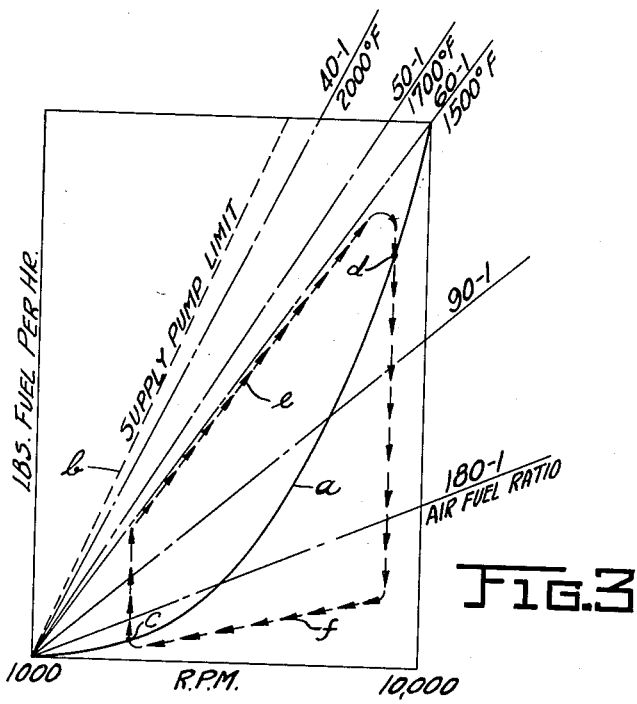
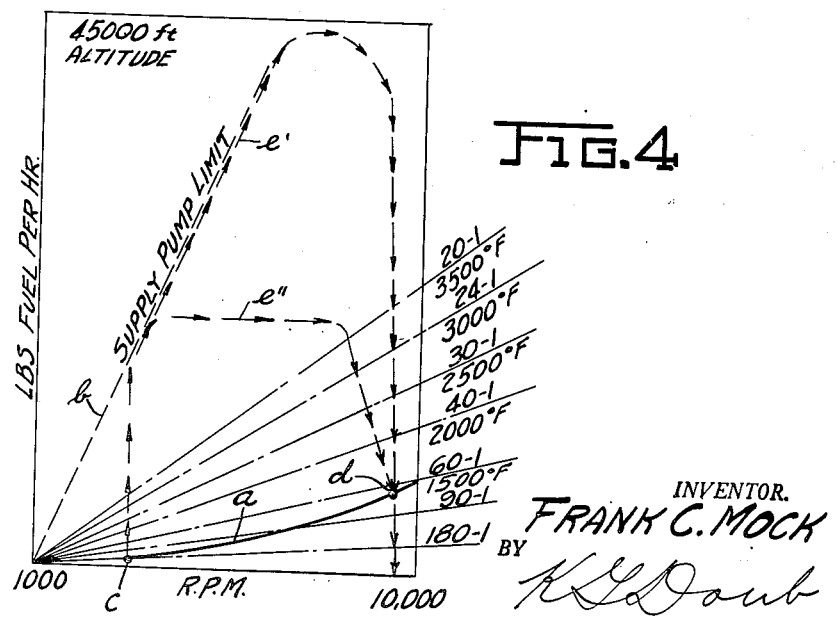

2,581,276

UNITED STATES PATENT OFFICE 2,581,276

FUEL FEED AND POWER CONTROL SYSTEM FOR GAS TURBINES, JET PROPULSION, AND THE LIKE

Frank C. Mock, South Bend, Ind., assignor to Bendix Aviation Corporation, South Bend, Ind., a corporation of Delaware Application May 30, 1945, Serial No. 596,620

18 Claims. (Cl. 60—39.28)

This invention relates to a fuel-feed and power control device for gas turbines, jet propulsion engines and like power plants utilizing the force or energy produced by the combustion and expansion of precompressed air; it is particularly adapted for jet propulsion power plants for aircraft wherein the air is compressed into a chamber constituting part of a generator, at which point it is heated by the combustion of fuel, and the air and products of combustion passed through a turbine for driving a compressor and then discharged through a reaction jet to propel the aircraft; and power plants for aircraft wherein a gas turbine drives the propeller of the aircraft and may in addition drive a compressor for supplying air to a combustion chamber or generator, and wherein also the exhaust from the turbine may be discharged through a reaction jet to obtain a propulsion effort augmenting that of the propeller.

When a centrifugal or axial flow compressor is connected to and rotated in synchronism with a gas turbine driven by the energy of expanded gases produced in a combustion chamber or burner in which the air is compressed, at a given entering air density the weight of air flowing will vary approximately with the R. P. M., the pressure of compression will vary approximately with the square of the R. P. M., and the power required for compression and accompanying air flow will vary approximately with the cube of the R. P. M. When power is controlled by regulation of the fuel feed, the rate of feed required will vary approximately with the R. P. M.$^3$, and accordingly, if the fuel feed is selected, the turbine speed will either increase or decrease until a speed corresponding to the selected fuel feed is obtained.

An extremely simple power control arrangement for gas turbines and jet propulsion engines may be provided by connecting a power control lever or quadrant to a metering needle or valve adapted to vary the area of a metering orifice or variable feed restriction to which fuel is supplied under pressure, as by an engine-driven fuel pump. With this arrangement, the pilot advances or retracts the control lever or quadrant to obtain a selected speed, whereupon the engine speeds up or slows down to a speed corresponding to the rate of fuel feed set by the lever or quadrant. Another relatively simple arrangement may be had by operatively connecting an engine-driven governor with the metering needle in a manner such that the governor functions to establish equilibrium at the rate of fuel feed selected or the point of acceleration or deceleration set by the pilot's control lever. While such systems have the advantage of simplicity, there is danger of producing such a hot flame during acceleration as will tend to burn out the burner tubes and damage the turbine blades, while during deceleration there is the liability of reducing the fuel-to-air ratio to a point where the burner will go out or fail. When the area of the metering orifice is suddenly increased to obtain the desired speed, the engine lags and the fuel supplied to the burners is greatly in excess of that required for the quantity of air delivered to the burners in proportion to engine speed, and as a consequence an extremely hot flame is produced which not only tends to damage and shorten the life of the engine or power plant but also constitutes a waste of fuel. On the other hand, when the area of the metering orifice is suddenly reduced and the rate of fuel fed correspondingly reduced, the engine temporarily maintains its speed due to momentum and the fuel/air ratio becomes so lean as to prohibit flame propagation, resulting in burner failure.

It is also desirable to provide some means for compensating for changes in entering air density irrespective of what type of power control system is adopted, since less fuel is required to drive a turbine and compressor at a given speed upon a decrease in density, and if the same rate of fuel feed is maintained the proportion of fuel to air will become further unbalanced, aggravating the tendency to overheat the burner system.

An object of the present invention is to provide a fuel-feed and power-control system for power plants of the type specified wherein the rate of fuel feed may be controlled simply by a lever or quadrant connected to a metering needle or valve for varying the area of a fuel metering orifice without danger of overheating the burner system during acceleration, or burner failure during deceleration.

Another object is to provide simplified fuel-feed and power-control mechanism for power plants of the type specified wherein the rate of fuel feed is maintained substantially proportional to engine speed at all positions of the throttle or power control lever.

A further object is to generally improve and simplify fuel-feeding systems for power plants of the type specified.

The foregoing and other objects and advantages will become apparent in view of the following description taken in conjunction with the appended drawings, in which:

Figure 1 is a substantially central longitudinal sectional view of a jet propulsion power plant or engine incorporating a fuel-feed and power-control system in accordance with the present invention;

Figure 2, a detail view in section and to some extent diagrammatic of the fuel-metering and power-control unit;

Figure 3, a curve chart illustrating the operation of the system; and

Figure 4, a curve chart for comparison with that of Figure 3 illustrating the differences in operation between the herein-disclosed system and those of the prior art wherein power is controlled (1) by a direct manual connection with a fuel valve without barometric correction and (2) by a resetting a governor operatively connected to a fuel valve, also without barometric correction.

Referring first to Figure 1, an aircraft engine nacelle is indicated at 10 and has supported therein as by means of ring 11 and brackets 12 a jet propulsion engine or power plant generally indicated at 13 and including an outer casing 14, flared or curved at its front extremity to define an air inlet 15 and contoured at its rear extremity to define a reaction tube 16. A rotary air compressor 17 forces air into an annular header 18 which supplies it to a plurality of peripherally spaced cylinder-like generators or burner chambers 19 containing burners 20 having air-inlet holes 20' in the peripheral walls thereof. The burners 20 discharge into a collector ring 21 arranged to deliver the hot air and products of combustion through a set of stationary directing blades 22 against the blades 23' of a turbine rotor 23. The turbine 23 and air compressor 17 are mounted on a common shaft 24 rotatably supported by a bearing 24'. Air entering the inlet 15 is picked up by the compressor, which acts to direct the air into chamber 18 and generators 19, and thence into the burners 20 through holes 20', where heat is added by the combustion of fuel. The expanded air and products of combustion are directed against the blades 23' of the turbine 23 to drive the compressor and are then discharged to the atmosphere through the reaction tube 16 to effect propulsion of the plane. If desired, propulsion of the plane may also be accomplished by a propeller driven off of a forward extension of shaft 24, preferably through suitable reduction gearing.

Referring now to Figure 2, the fuel-metering and power-control unit generally indicated at 25 is adapted to control the flow of liquid fuel to the burners 20; it comprises a suitable housing or casing 25' provided with a fuel inlet conduit 26 having mounted therein an engine-driven fuel pump 27 which draws fuel from a suitable source of supply such as a fuel tank, not shown, and delivers it under pressure to chamber 28. A by-pass valve 29 controls by-pass port 30 and channel 30' leading back to the inlet or low-pressure side of the pump, said valve being mounted on a diaphragm 31 overlying chamber 32 and urged toward seated position by spring 33. The chamber 32 is vented to the fuel-discharge side of the metering unit, or to metered fuel or discharge nozzle pressure by means of duct or conduit 34. The effective area of the diaphragm 31 is preferably substantially the same as that of valve 29, and hence the fuel supply pressure in chamber 28 will be maintained at a constant value above metered fuel or nozzle discharge pressure as determined by the strength of spring 33.

Fuel from chamber 28 flows through valve port or orifice 35 into unmetered fuel chamber D and thence by way of conduit 36 through metering orifice or restriction 37 to discharge conduit 38 which in effect constitutes a continuation of conduit 26. Port 35 is controlled by a regulator valve 39 of the poppet type having a stem 39' operatively connected to diaphragms 40 and 41 which form movable walls of metered fuel chamber C, differential control chamber A and unmetered fuel chamber D. The area of metering orifice or restriction 37 is regulated by a needle 42 controlled in a manner to be described.

A passage 43 leads from chamber C to an impeller chamber 44, the latter communicating with chamber A through passage 45, variable orifice 46 and passage 47. A centrifugal impeller or hydraulic governor 48 is mounted on a shaft 49 having a geared drive connection with the turbine and compressor shaft 24 as illustrated in Figure 1. Thus the impeller 48 is driven in direct relation to turbine and compressor speed, and at a fixed area of orifice 46 will produce a pressure differential between chamber C and chamber A proportional to the square of such speed, or the square of engine speed, the word "engine" as used herein meaning the power plant including the turbine and compressor.

A passage 50 having a bleed or restriction 51 therein communicates chamber A with the metered fuel passage or discharge conduit 38.

The diaphragms 40 and 41 may be of equal effective area, and a spring 52 backed by adjusting screw 53 engages the rear end portion of the poppet valve stem 39' and serves as a means whereby the effective differential pressure across the diaphragm 40 and hence across the metering orifice 37 may be adjusted within certain limits relative to the differential across diaphragm 41. This spring represents a constant which may vary in accordance with the idling or low speed fuel requirements of different types of engines or gas turbines; it may serve to modify the effective differential pressure produced by the pump or impeller 48.

The metering differential may be corrected for altitude or changes in air density by means of a capsule 54, responsive to changes in pressure and temperature and located at a point where it will be exposed to the air flowing to the engine or to the atmosphere. It is preferably located at a point where it is subjected to the "ram" effect resulting from forward motion of an airplane in flight. A needle 55 is connected to the movable end of the capsule 54 and projects into the orifice 46 to vary the effective area of the latter and thus vary the effective differential across diaphragm 41 and hence the differential across diaphragm 40 and metering orifice 37.

Secured on shaft 49 and rotating therewith is a mechanical all-speed governor 56 including weights 56' which control the position of a sleeve 57 slidingly mounted on a reduced extension of said shaft. A lever 58 is pivotally supported or fulcrumed at 59; and at its one end said lever is provided with a ball-headed fork 60 engaging in an annular recess provided with the outer end of needle 42, and at its opposite end with another fork 61 engaging in a similar recess provided in an enlargement of the sleeve 57.

A single power control lever 62 connects through link 63 and bell crank 64 with the outer free end of spring 65 which at its inner end bears against the adjacent end of sleeve 57. The fully retracted and advanced positions of the lever 62 (and hence the needle 42) may be definitely determined by a quadrant 62′, as may also the intermediate positions of said lever and needle.

Metered fuel flows from conduit 38 through fuel line 68 to intake manifold 69 and thence to the individual burners through fuel lines 70 (note Figure 1), and discharge nozzles 71. These nozzles may, for example, be of the type illustrated in my copending application Serial No. 557,812, filed October 9, 1944.

The operation is, in general, as follows:

The engine or power plant may be started in any known manner, as by an electric starting motor having a driving connection with the main drive shaft, to start the burner and bring the turbine up to a speed where it will accelerate without outside help. The metering unit would ordinarily be filled with fuel, but assuming it to be empty, the differential across diaphragms 40 and 41 will be zero and valve 39 will be open under the influence of spring 52. When the fuel pump 27 starts, chambers D, C and A will fill in successive order and fuel will also flow through conduits 38 and 68 to the manifold ring 69 and thence through fuel lines 70 to the burner nozzles 71. For the idling range, the differential across diaphragms 40 and 41 will be at a low value with the needle 42 open sufficiently to pass enough fuel to maintain flame propagation in the burners 19. The spring 52 may also be used to facilitate starting, since at low engine speeds it determines the position of valve 39 independent of speed and hence predetermined starting flows may be built into the control.

The centrifugal pump 48 operates at a fixed ratio of speed with respect to the speed of the turbine and compressor; and for a given area of metering orifice 37 and altitude or density control orifice 46, it will produce a pressure differential between chambers C and A proportional to the square of engine speed and tending to open valve 39. As valve 39 opens, the pressure in chamber D increases until the pressure differential across diaphragm 40 balances the force on diaphragm 41. Assuming the diaphragms 40 and 41 to be of equal effective area, the pressure in chamber C will be balanced out and any change in pressure in chamber A will vary the differential across diaphragm 41 and will correspondingly increase or decrease the pressure in chamber D.

The pressure differential between chambers D and C is imposed across metering orifice 37, and since this differential is substantially proportional to the square of engine speed, for any given position of needle 42 the velocity and hence the weight of fuel flow through the orifice will be proportional to the square root of this differential or to the speed directly.

The differential across metering orifice or feed restriction 37 produces a force on diaphragm 40 tending to close valve 39, while the centrifugal pump 48 creates a force on diaphragm 41 tending to open the said valve; and for any given position of needle 42 these opposing forces are balanced so that fuel feed is in direct relation to engine speed. If needle 42 is retracted, the differential across diaphragm 40 tends to decrease, valve 39 moves toward open position to reestablish the differential pressure and fuel feed to the burners is increased, whereupon the engine or turbine speeds up thereby further increasing the metering differential pressure and the fuel flow. This continues until an equilibrium speed is obtained, as will be made more clear hereinafter by the description of Figure 3. Movement of needle 42 inwardly or in a direction to restrict feed orifice 37 temporarily increases the differential across said diaphragms, whereupon valve 39 moves toward closed position to reduce the fuel flow, and the turbine or engine speed will be reduced until a point of equilibrium is reached.

To accelerate the engine, the power control lever 62 is moved in a direction to compress spring 65 and move sleeve 57 upwardly or inwardly on shaft 49, whereupon needle 42 enlarges the area of metering orifice 37, the governor is reset and the weights 56′ thereof have their effective throw temporarily reduced. Fuel flow to the burners is now increased and the engine speeds up to a point where the governor reaches a balanced condition consistent with its reset position; but during this period of acceleration, the metering head or differential and hence the rate of fuel feed will increase substantially in relation to engine speed as will also the quantity of air delivered to the burners.

The curve chart of Figure 3 illustrates the acceleration and deceleration characteristics of the device of Figure 2. In this figure curve $a$ represents the fuel feed required for steady speed, that is, the rate at which fuel would be fed to maintain the engine at some predetermined or selected speed, at a given air density. The dotted line $b$ represents the capacity of the fuel pump. The dot and dash lines represent the fuel flow vs. speed characteristic of the device of Figure 2 for various settings of needle valve 42, each line having indicated thereon the approximate air-fuel ratio which would result, for example, at ground level density, and also the approximate temperatures produced by the ratio of fuel to air. Let it be assumed that the engine is operating at speed $c$ and the pilot withdraws metering needle 42 to a point which will produce speed $d$; then the fuel supply during this period of acceleration would follow the arrows $e$ from $c$ to $d$. The initial increase in flow represented by the vertical arrows occurs as a result of the increase in effective area of the metering orifice 37 at the then existing speed. As the speed increases, the fuel flow will increase in straight line relation with the speed until equilibrium operation is attained at $d$. During this period of acceleration the fuel flow does not attain such magnitude as to produce harmful temperatures. If now the pilot returns his power control lever to its original setting, the fuel flow will follow arrows $f$ from $d$ back to $c$. During this deceleration, the fuel flow is maintained sufficiently high to prevent burner failure.

Upon a decrease in the density of the air flowing to the engine, less fuel is required to drive the turbine and compressor at a given speed, and unless this is corrected, the ratio of air to fuel during acceleration will be further reduced and higher temperatures will result at high altitudes than under corresponding conditions at sea level. In Figure 2, compensation for changes in air density is had by varying the area of orifice 46, a decrease in density causing elongation of bellows 54 and reduction of the area of said orifice and a corresponding reduction in pressure in chamber A for a given engine speed and area of metering orifice 37, whereupon the fuel valve 39 will tend to close, the metering differential will be reduced correspondingly and less fuel will be supplied to the burners. Thus with the metering device of Figure 2, temperature rise due to acceleration is not aggravated by increase in altitude or a reduction in air density, since the feed of fuel is reduced in relation to the mass weight of air pumped by the compressor. The density compensating circuit, including variable orifice 46, passage 50, and fixed restriction or bleed 51, is located downstream of the metering orifice 37, and hence all fuel flowing to the engine is metered.

Figure 4 illustrates how the curve a (fuel required for steady speed) is lowered at high altitudes, for example 45,000′. Without density compensation the danger of overheating as the result of increased fuel feed without accompanying increase in engine speed or correlation of engine speed and power lever or quadrant position becomes greater. This figure also includes arrow curves representing acceleration by prior art governor control alone as well as by a direct connection between throttle lever and metering valve with or without a governor for maintaining equilibrium at a given fuel rate selection. The dotted arrow lines at e′ indicate how when a speed governor controlling the fuel valve is reset to accelerate from c to d, the full capacity of the fuel pump is delivered to the engine and fuel will be supplied greatly out of proportion to the air being pumped, thereby producing intense heat in the burner system. The dotted arrow line e″ indicates the rate of fuel feed during acceleration with a direct-connected lever. In this instance the ratio of fuel to air is not so out of proportion as with governor control alone, but it is still such as to produce intense heat in the burner system, particularly during the initial portion of the period of acceleration. In both types of control systems of Figure 4 the deceleration curve drops below the normal fuel rate for steady speed with resultant danger of burner failure.

It will be understood that no attempt has been made herein to set forth all of the advantages, applications and metering characteristics of the apparatus comprised in the present invention; and it will also be understood that the drawings are simply illustrative of the invention and that in actual practice it is usually necessary to rearrange and modify the various parts to adapt the controls to different installations; all such changes and modifications coming within the scope of the invention as defined by the appended claims.

I claim:

1. In a system for controlling the flow of liquid fuel to the burner of a gas turbine engine, means defining a flow passage for the fuel having a variable feed restriction therein, a manually controllable valve for selectively varying the area of said restriction to accelerate and decelerate the engine, a regulator valve movable to different positions to control the metering head across said restriction, means for automatically positioning said regulator valve as a function of engine speed, and means responsive to changes in pressure of the air flowing to the burner for modifying the action of the regulator valve.

2. In a system for controlling the flow of liquid fuel to the burner of a gas turbine engine having a turbine driven compressor for supplying air under pressure to the burner, means defining a flow passage for the fuel having a variable feed restriction therein, a throttle valve manually controllable to selectively vary the area of the restriction to accelerate and decelerate the engine, a regulator valve movable to different positions to adjust the metering head across said restriction, pressure responsive means connected to the regulator valve, means for automatically producing a differential across said pressure responsive means varying with variations in engine speed, and means responsive to changes in pressure of the air flowing to the compressor for modifying said differential.

3. In a system for controlling the flow of liquid fuel to the burner of a gas turbine engine having a turbine driven compressor for supplying air under pressure to the burner, means defining a flow passage for the fuel having a variable feed restriction therein, a throttle valve for varying the area of said restriction to accelerate and decelerate the engine, a manually operable member operatively connected to said valve, an engine driven adjustable speed governor also having an operative connection with said valve and adapted to be reset by said member to automatically maintain a selected engine speed, a regulator valve movable to different positions to adjust the metering head across said restriction, pressure responsive means connected to the regulator valve, means for subjecting said pressure responsive means to a differential varying with variations in engine speed to automatically maintain the rate of fuel feed within predetermined limits during acceleration and deceleration, and means responsive to changes in pressure of the air flowing to the compressor for modifying said differential.

4. In a system for controlling the flow of liquid fuel to an engine, means defining a flow passage for the fuel having a variable feed restriction therein, a throttle valve for varying the area of the restriction to accelerate and decelerate the engine, manual means for controlling the throttle valve, a regulator valve controlling flow of fuel to said restriction, pressure responsive means connected to said regulator valve, means creating a force on said pressure responsive means in a direction tending to open the regulator valve varying with variations in engine speed and said pressure responsive means during operation of the engine being subjected to the differential feed pressure across said restriction in a direction tending to close the regulator valve, the regulator valve being thus automatically controlled as a function of engine speed operating to establish a metering head across the feed restriction proportional to engine speed and thereby maintain the rate of fuel feed within predetermined limits during acceleration and/or deceleration irrespective of how suddenly the throttle valve may be moved toward open position for maximum acceleration or moved toward closed position to decelerate to low or idle speeds.

5. A system as claimed in claim 4 wherein means are provided for pressurizing fuel to said regulator valve including an engine driven supply pump having a coacting by-pass and a by-pass control valve subjected in a valve closing direction to the pressure of fuel downstream of said restriction plus a substantially constant spring force and whereby the fuel supply pressure is always maintained at a substantially constant value higher than fuel discharge pressure as determined by said constant.

6. A system as claimed in claim 4 wherein a spring is arranged to act on the regulator valve in a valve opening direction at low differential pressures across said pressure responsive means and permit said valve to pass sufficient fuel to maintain low or idling engine speeds.

7. In a system for controlling the flow of liquid fuel to the burner of a gas turbine engine having a turbine driven compressor for supplying air under pressure to the burner, means defining a flow passage for the fuel having a variable feed restriction therein, a throttle valve for varying the area of the restriction to accelerate and decelerate the engine, manual means for controlling the throttle valve, a regulator valve controlling flow of fuel to said restriction, diaphragm means connected to said regulator valve, an engine driven governor arranged to produce a force varying with variations in engine speed tending to open the regulator valve and said diaphragm means during operation of the engine being subjected to the differential feed pressure across said restriction in a direction tending to close the regulator valve, the regulator valve being thus controlled as a function of engine speed operating to establish a metering head across the said restriction proportional to engine speed and thereby automatically maintain the rate of fuel feed within predetermined limits during acceleration and deceleration irrespective of how suddenly the throttle valve may be moved towards open position for maximum acceleration or moved towards closed position to decelerate to low or idle speeds, and means responsive to changes in density of the air flowing to the compressor for modifying the regulating differential produced across said diaphragm means.

8. In a system for controlling the flow of fuel to an engine, means defining a flow passage for the fuel having a metering restriction therein, a throttle valve for varying the area of said restriction to vary the speed of the engine, a manually adjustable governor adapted to be driven by the engine and operatively connected to said valve for automatically positioning the valve to regulate the engine speed at a value determined by the governor adjustment, manual means operable at the will of a pilot for varying the adjustment of the governor and simultaneously repositioning said throttle valve, and means responsive to changes in pressure of the air flowing to the engine for automatically varying the metering head across said metering restriction at any given position of the throttle valve.

9. In a system for controlling the rate of fuel feed to a gas turbine engine, a fuel conduit for supplying fuel to the engine having a metering restriction therein, a throttle valve for varying the effective area of the restriction, a regulating valve in said conduit for varying the metering head across said restriction, pressure responsive means connected to said regulating valve, and means for modifying the action of said regulator valve including a restricted flow passage or chamber through which metered fuel is circulated to modify the differential across said pressure responsive means having its inlet located downstream of said metering restriction and means responsive to changes in pressure of the air flowing to the engine for varying the pressure in said passage or chamber.

10. A system as claimed in claim 9 wherein there is a pair of restrictions in series in said passage and the means responsive to changes in pressure of the air flowing to the engine is arranged to vary the effective area of one of said restrictions.

11. A system as claimed in claim 9 plus means responsive to variations in engine speed for varying the pressure in said passage or chamber.

12. In a system for controlling the flow of liquid fuel to the burner of a gas turbine engine having a turbine driven compressor for supplying air under pressure to the burner, means defining a flow passage for the fuel having a variable feed restriction therein, a throttle valve manually controllable to selectively vary the area of the restriction to accelerate and decelerate the engine, a regulator valve movable to different positions to adjust the metering head across said restriction, pressure responsive means connected to the regulator valve, means for automatically producing a differential across said pressure responsive means varying with variations in engine speed, and means responsive to changes in temperature of the air flowing to the compressor for modifying said differential.

13. In a system for controlling the flow of liquid fuel to the burner of a gas turbine engine having a turbine driven compressor for supplying air under pressure to the burner, means defining a flow passage for the fuel having a variable feed restriction therein, a throttle valve for varying the area of said restriction to accelerate and decelerate the engine, a manually operable member operatively connected to said valve, an engine driven adjustable speed governor also having an operative connection with said valve and adapted to be reset by said member to automatically maintain a selected engine speed, a regulator valve movable to different positions to adjust the metering head across said restriction, pressure responsive means connected to the regulator valve, means for subjecting said pressure responsive means to a differential varying with variations in engine speed to automatically maintain the rate of fuel feed within predetermined limits during acceleration and deceleration, and means responsive to changes in temperature of the air flowing to the compressor for modifying said differential.

14. In a system for controlling the flow of fuel to an engine, means defining a flow passage for the fuel having a metering restriction therein, a throttle valve for varying the area of said restriction to vary the speed of the engine, a manually adjustable governor adapted to be driven by the engine and operatively connected to said valve for automatically positioning the valve to regulate the engine speed at a value determined by the governor adjustment, manual means operable at the will of a pilot for varying the adjustment of the governor and simultaneously repositioning said throttle valve, and means responsive to changes in temperature of the air flowing to the engine for automatically varying the metering head across said metering restriction at any given position of the throttle valve.

15. In a system for controlling the rate of fuel feed to a gas turbine engine, a fuel conduit for supplying fuel to the engine having a metering restriction therein, a throttle valve for varying the effective area of the restriction, a regulating valve in said conduit for varying the metering head across said restriction, pressure responsive means connected to said regulating valve, and means for modifying the action of said regulator valve including a restricted flow passage or chamber through which metered fuel is circulated to modify the differential across said pressure responsive means having its inlet located downstream of said metering restriction and means responsive to changes in temperature of the air flowing to the engine for varying the pressure in said passage or chamber.

16. A system as claimed in claim 15 wherein there is a pair of restrictions in series in said passage and the means responsive to changes in temperature of the air flowing to the engine is arranged to vary the effective area of one of said restrictions.

17. A system as claimed in claim 15 plus means responsive to variations in engine speed for varying the pressure in said passage or chamber.

18. In a system for controlling the flow of liquid fuel to the burner of a gas turbine engine, means defining a flow passage for the fuel having a variable feed restriction therein, a manually controllable valve for selectively varying the area of said restriction to accelerate and decelerate the engine, a regulator valve movable to different positions to control the metering head across said restriction, means for automatically positioning said regulator valve as a function of engine speed, and means responsive to changes in temperature of the air flowing to the burner for modifying the action of the regulator valve.

FRANK C. MOCK.

REFERENCES CITED

The following references are of record in the file of this patent:

UNITED STATES PATENTS

| Number | Name | Date |
| --- | --- | --- |
| 2,095,991 | Lysholm | Oct. 19, 1937 |
| 2,223,381 | Mock | Dec. 3, 1940 |
| 2,306,953 | Jung | Dec. 29, 1942 |
| 2,358,815 | Lysholm | Sept. 26, 1944 |
| 2,374,844 | Stokes | May 1, 1945 |
| 2,407,115 | Udale | Sept. 3, 1946 |
| 2,440,566 | Armstrong | Apr. 27, 1948 |

FOREIGN PATENTS

| Number | Country | Date |
| --- | --- | --- |
| 429,682 | Great Britain | June 4, 1935 |